J. B. Minor.

Seed Planter.

N° 91,655.    Patented Jun. 22, 1869.

Witnesses.    Inventor.

United States Patent Office.

JOHN B. MINER, OF GROTON, CONNECTICUT.

Letters Patent No. 91,655, dated June 22, 1869.

---

IMPROVEMENT IN SEED-PLANTER.

---

The Schedule referred to in these Letters Patent and making part of the same.

---

*To all whom it may concern:*

Be it known that I, JOHN B. MINER, of Groton, in the county of New London, and State of Connecticut, have invented a new and useful Improvement in Seed-Planters; and I do hereby declare that the following is a full, clear, and exact description thereof, which will enable others skilled in the art to make and use the same, reference being had to the accompanying drawings, forming part of this specification.

This invention relates to a new and useful improvement in machines for planting corn and other seeds, and consists in the construction and arrangement of parts as hereinafter described.

In the accompanying plate of drawings—

Similar letters of reference indicate corresponding parts.

Figure 1:
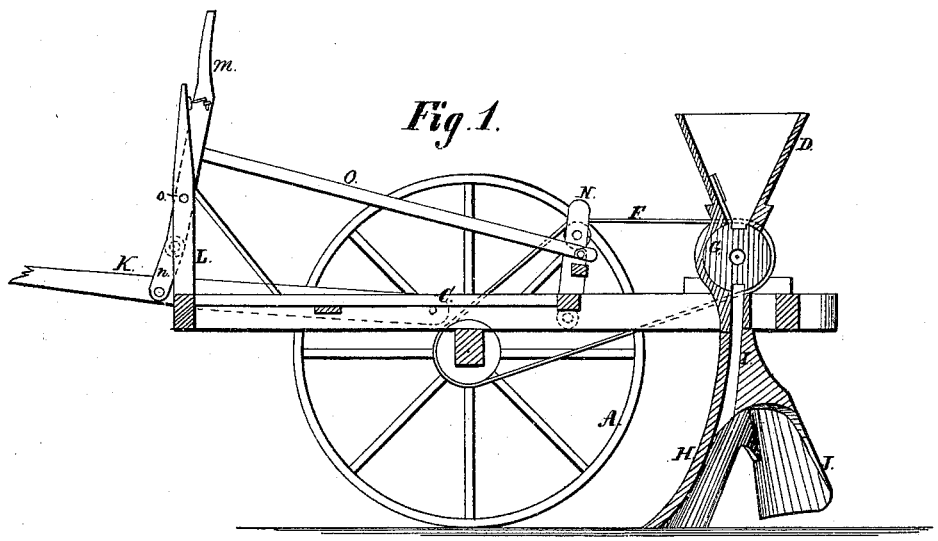
Figure 1 represents a vertical longitudinal section of fig. 2, through the line *x x*.
Figure 2:
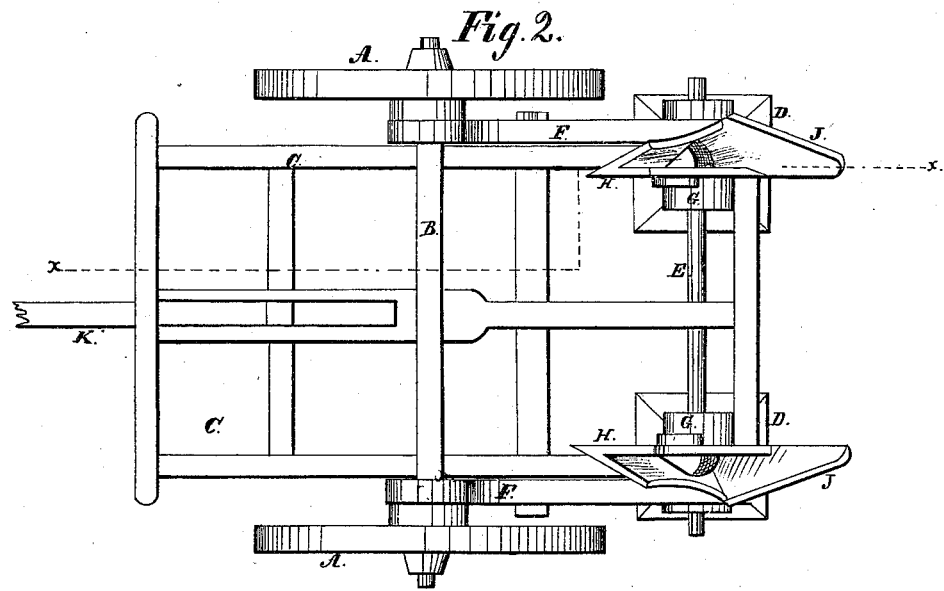
Figure 2 is a bottom view.

This machine is supported on two wheels, A A.

B represents the axle.

C is a platform on the axle.

D D represent hoppers in which the corn or seed to be planted is placed.

E is a transverse shaft, passing over the platform, having pulleys on its ends, and is revolved by belts F, which pass around the pulleys and around the inner ends of the wheel-hubs, as seen in the drawing.

The shaft E passes directly under the hoppers, at which points there are rolls G G, which have recesses or cavities in their peripheries for receiving from the hoppers the requisite quantity of seed to be dropped for each hill.

In this example of my invention there are two of these seed-receptacles, as seen in fig. 1, so that they receive seed and drop it twice in each revolution.

H H represent tubular plow-teeth, which are attached to the under side of the platform, directly beneath the rolls G, so that they receive the seed from the cavities in the rolls, and conduct it to the ground, or into the furrows made by the plowshares or teeth H H.

I represents the apertures through the teeth. (See fig. 1.)

J J represent wings, which are attached to the heels of the plow-teeth H. They are thin, broad plates, inclining back from their points of intersection with the plow-teeth, and are placed at an angle of about forty-five degrees with the track or line of travel, so that the furrow made by the teeth, into which the seed is dropped, is entirely filled, and the seed covered as fast as dropped.

A roller or rollers may be attached to the back end of the frame or platform, arranged so as to follow the wings J J, and press down the earth over the seed. The seed will of course be dropped fast or slow, according to the speed of the shaft E.

This will be governed by the diameter of the wheels A and their hubs, and the pulleys on the ends of the shaft E.

Instead of the short rolls G G, there may be a continuous roll or cylinder on the shaft E, with longitudinal channels or grooves therein, and with a single continuous hopper above for delivering the seed, and thereby sowing the seed broadcast.

K represents the tongue.

This is confined between two uprights L.

M is a lever, which is connected with the tongue by means of two straps *n*, one on each side, and which has its fulcrum at *o* on the stands or uprights L.

The tongue K is attached near the middle of the platform by a pivot-connection.

The effect of drawing down the lever from the position seen in the drawing will be to depress the forward end of the platform when the tongue is prevented from rising, which it would be when the team is attached, and consequently raising the plow-teeth from the ground. This would be done in going to or from the field.

Another operation, beside raising the teeth from the ground, is performed by thus depressing the lever *n*.

N represents a binder or tightener for the belts F F, which consists of two stands N, pivoted to each side of the machine, connected by a transverse bar, which is connected with the lever *m* by the rod O.

On each of the uprights there is a pulley, as seen at N, over which the belts pass.

With the lever *m* in an upright position as seen, the belts are tightened as the stands N are brought upright.

When the lever is brought down for raising the plow-teeth from the ground, the stands N are thrown back from an upright position, and the belts are loosened, thus stopping the motion of the shaft E and the dropping of the grain.

To the end of the axle B, a marker may be attached for guiding the driver in arranging the rows.

It will be seen that as the driver stands upon the platform, with the lever *m* within his reach, he has the machine perfectly under his control. He can raise the plow-teeth and stop the dropping of seed at his pleasure.

Having thus described my invention,

I claim as new, and desire to secure by Letters Patent—

1. In combination with a seed-planter, the wings J, constructed and arranged substantially as and for the purposes described.

2. The combination of the pivoted lever *m*, connecting-rod O, and pivoted roller-arms N with the tongue K, platform C, belt F, and seed-droppers G, all arranged as described, whereby the seed-droppers are thrown in or out of operation, and the plows raised or lowered simultaneously, substantially as described for the purpose specified.

JOHN B. MINER.

Witnesses:
FRANK BLOCKLEY,
ALEX. F. ROBERTS.